(No Model.)  F. H. RICHARDS.  3 Sheets—Sheet 1.
WEIGHING MACHINE.

No. 579,454.  Patented Mar. 23, 1897.

Witnesses:
O. W. Smith
Fred. J. Dole.

Inventor;
F. H. Richards.

(No Model.)  3 Sheets—Sheet 2.

F. H. RICHARDS.
WEIGHING MACHINE.

No. 579,454.  Patented Mar. 23, 1897.

Witnesses:
O. W. Smith
Fred. J. Dole.

Inventor:
F. H. Richards.

(No Model.) 3 Sheets—Sheet 3.

F. H. RICHARDS.
WEIGHING MACHINE.

No. 579,454. Patented Mar. 23, 1897.

Witnesses;
O. W. Smith
Fred. J. Dole.

Inventor;
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,454, dated March 23, 1897.

Application filed December 12, 1896. Serial No. 615,447. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object of the invention being to furnish an improved and efficient machine of this character more especially adapted for automatically weighing and delivering fluids of various kinds with facility and precision.

Figure 1:
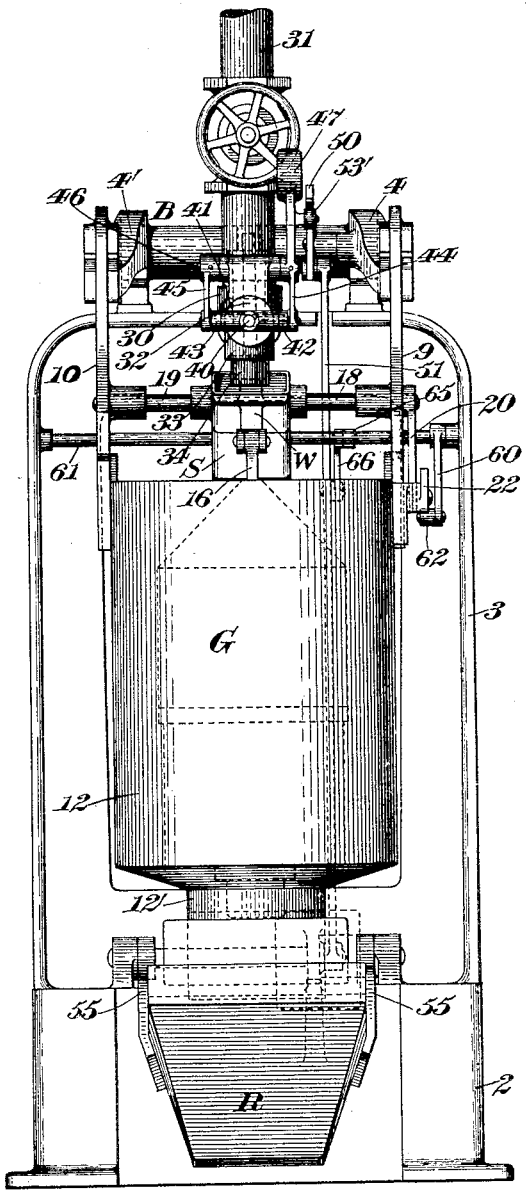
Figure 2:
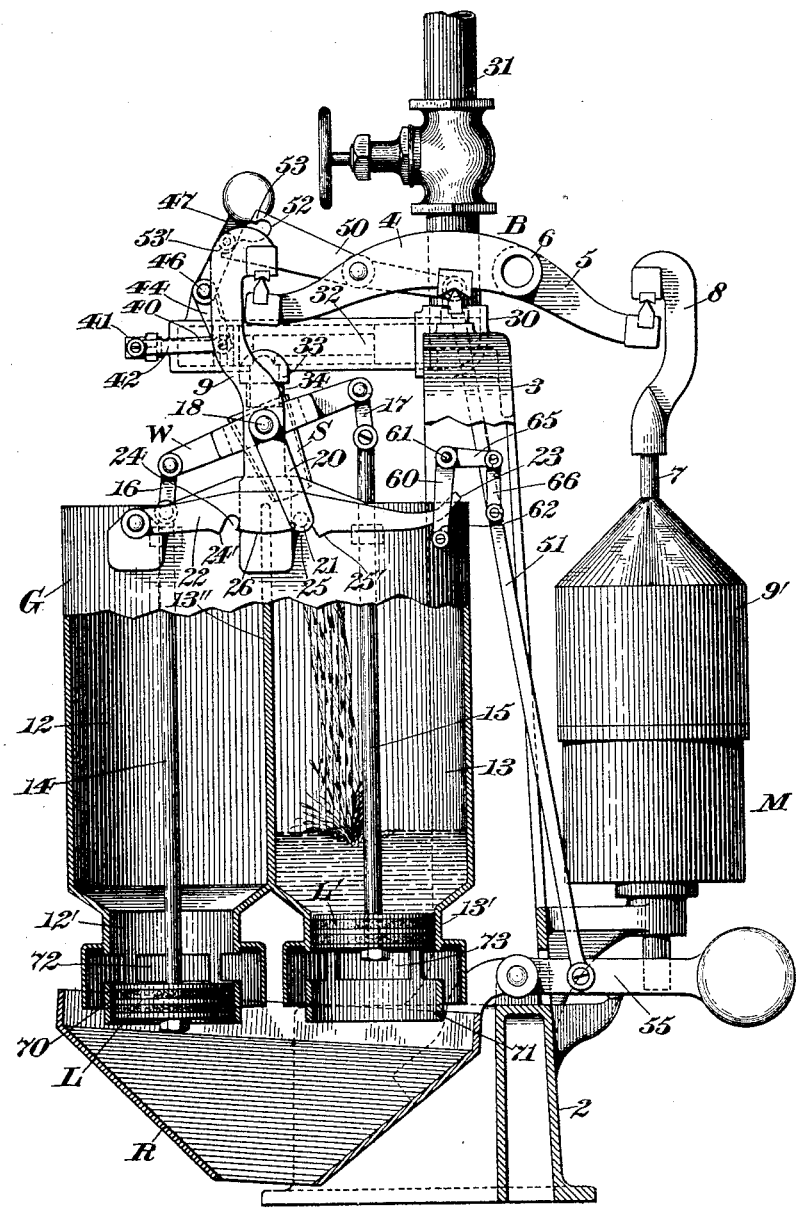
Figure 3:
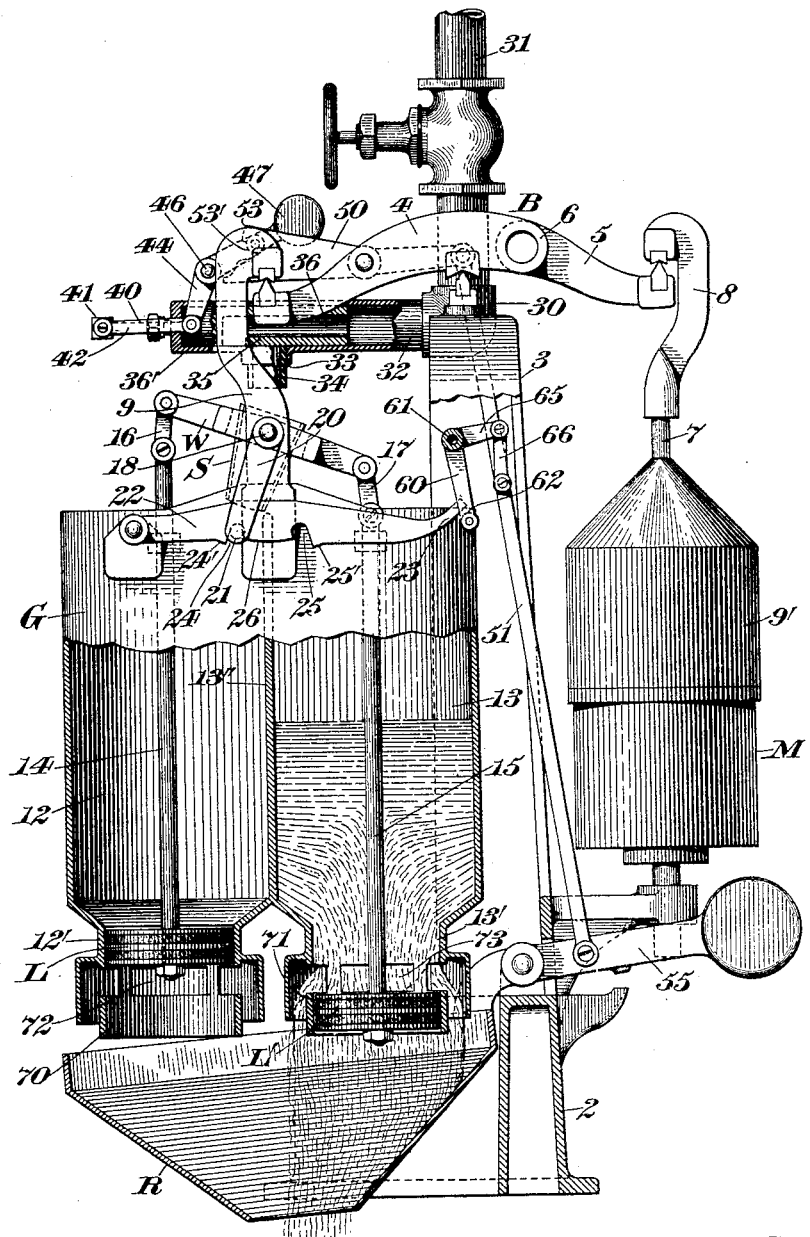

In the drawings accompanying and forming part of this specification, Figure 1 is a front elevation of a weighing-machine embodying my present improvements. Fig. 2 is an end elevation as seen from the right in Fig. 1, parts of the machine being in central vertical section; and Fig. 3 is a similar view showing one of the compartments discharging its contents.

Similar characters designate like parts in all the figures of the drawings.

The framework for supporting the operative parts of the machine in the present instance consists of a substantially U-shaped base 2 and a column or standard 3, which is made up of two parallel upright members joined at the top.

The weighing mechanism includes a preferably counterweighted scale-beam and a weighing device, which latter consists of a bucket having a plurality of load-receiving compartments.

The scale-beam is designated by B, and it has a pair of forwardly-extending bucket-supporting arms 4 and 4' and an oppositely-disposed weight-carrying arm 5, the two arms 4 and 4' being joined by the preferably tubular shaft 6, a short distance forward of which the beam B is fulcrumed upon the standard 3. The scale-beam B carries a main weight M, which is connected to a rod 7, said rod having a hook 8 furnished with a notched bearing which rests upon a knife-edge on the beam-arm 5, in a manner similar to that shown in Letters Patent No. 442,720, granted to me December 16, 1890, to which reference may be had, and a series of load-weights may be mounted upon the main weight M, which, however, are not shown and which can be incased by the conical dust-guard 9' and may embrace the rod 7, as shown in my said Letters Patent.

The beam-arms 4 and 4' are shown sustaining the bucket-hangers 9 and 10 by a knife-edge and notch-bearing connection, said hangers being attached at their lower extremities to the opposite faces of the weighing device or bucket G.

The bucket has a plurality of load-receiving chambers or compartments which are designated, respectively, by 12 and 13, and which are separated by the partition 13'', and each of which has the usual discharge-outlet near its bottom, said outlets being designated by 12' and 13', respectively, and forming seats for closers, which are preferably in the form of piston-valves.

The closers for the load-receiving chambers 12 and 13, as just specified, are in the form of reciprocatory piston-valves, they being designated by L and L', respectively, and fitting tightly within the annular seats or discharge-outlets 12' and 13' and having the usual packing-rings.

The rod for the piston-valve or closer L is designated by 14, while the rod for the piston-valve L' is designated by 15, said rods being pivoted at their upper ends to the links 16 and 17, respectively, said links being connected at opposite ends to the walking or rocking beam W, which forms a carrier for the stream-diverter S, said stream-diverter S being fixed to a two-part shaft the respective sections of which are designated by 18 and 19 and are journaled in hubs or bearings on the inside faces of the bucket-hangers 9 and 10. (See Fig. 1.)

The stream-diverter S is in the form of a swinging or oscillatory spout disposed in the path of flow of the supply-stream and is adapted to deliver alternately said supply-stream into the load-receiving chambers 12 and 13, respectively, at the proper periods in the operation of the machine, suitable means being provided to hold said stream-diverter S in its two extreme or shifted positions, as represented in Figs. 2 and 3, respectively.

The shaft-section 18 is furnished with a depending rock-arm 20, which has at its free end a stop 21, consisting of an inwardly-disposed pin which is adapted to be alternately engaged by coöperative stops of a locking device or latch when the stream-diverter is in either of its said extreme positions. The latch or locking device for maintaining the stream-diverter S against movement is designated by 22, and it consists of a relatively long lever pivotally supported upon the bucket G, near the upper edge thereof, and having its free end curved upwardly, as at 23.

The locking-lever 22 has on its under face a series of stops in the form of notches 24 and 25, the stop 25 being illustrated in engagement with the stop 21, that is operative with the stream-diverter, Fig. 2, whereby said stream-diverter will be held in position to deliver a supply to the chamber 13. It will be evident also that when one or the other of the stops 24 or 25 is in engagement with the pin or stop 21 the closers or piston-valves L and L' will alternately be held by the latch or locking device 22, said last-mentioned member being shown in its effective positions in Figs. 2 and 3, respectively. Let it be assumed that the stop-pin 21 and stop 25 have been properly disengaged, which is accomplished by the falling of the bucket G. It will be evident that the closer L' will be freed of all restraint, and the full load being in the load-receiving chamber 13 the piston-valve or closer L' can be forced downward or opened, thereby drawing the rod 15 and link 17, and consequently the right-hand arm of the walking-beam W, downward, which action will result in swinging the stream-diverter, and hence the arm 20, to the left, whereby the stop-pin 21 will be caused to travel along the overrun curved guide-face 26 which intervenes between the locking-notches 24 and 25 until said pin abuts against the shoulder 24', it being then opposite the locking-notch 24. The locking-notch 25 has a similar shoulder 25', against which the stop-pin 21 is adapted to abut when the swinging spout S and rock-arm 20 and closer L' have reached the opposite limit of their working strokes.

When the closer L' is locked closed, it will be evident that its mate L is locked wide open, and vice versa, and as the closer L' is forced open in the manner set forth the walking-beam W will be rocked, the left-hand arm of the latter being elevated and the link 16 and piston-rod 14 being moved in correspondence therewith to carry the closer or piston-valve L to its seat 12'.

The horizontal member of the standard 3 is furnished, substantially midway thereof, with the coupling 30, into which leads the supply conduit or pipe 31, communicating with a source of supply, and which parts may be fitted together in some well-known manner, as by threading.

A supply cylinder or device is shown at 32, it being also connected to the coupling 30 and having the supply-opening 33, about which extends a circular flange and within which flange is disposed the nozzle 34, which is in alinement with the stream-diverter S.

The stream-controller for governing the supply of material to the bucket G consists of a valve 35 of the "slide" type, it being reciprocatory within the supply device or cylinder 32 and having a longitudinal bore through which the stream of material is adapted to flow from the supply-conduit 31, passing through the nozzle 34 and entering the stream-diverter S when said valve is open, the stream-diverter delivering it into one or the other of the two chambers 12 or 13.

The bore or port of the valve is designated by 36, and said valve is shown in its closed position in Fig. 3, wherein the solid portion thereof is represented covering the supply-opening 33 in the cylinder 32.

It will be evident that when the valve 36 is slid rearward from the position in which it is shown in Fig. 3 and when the transverse portion 36' of the longitudinal port is caused to register with the supply opening or orifice 33 a large stream of material will flow from the cylinder 32 through the port of the valve and the supply-opening 33. On the opposite movement of the valve, as the bucket descends, the volume of the stream will be progressively reduced in correspondence with the movement of the weighing mechanism.

The rod or stem of the piston-valve is designated by 40, it passing through a suitable stuffing-box in the head of the valve-cylinder and having at its outer extremity a cross-head 41, to the opposite ends of which are pivoted links 42 and 43, respectively, said links being likewise jointed to the arms 44 and 45, which are connected rigidly to the rock-shaft 46, journaled in lugs on the supply casing or cylinder 32, the arm 44 constituting the lower portion of the counterweighted valve actuating or controlling lever 47, which lever as it falls is adapted to close the valve 35 and on its opposite stroke is adapted to open said valve, such operations alternating to prevent and permit the passage of the supply to the bucket, which is guided into one or the other of the two chambers thereof by the oscillatory stream-diverter S.

The beam B shiftably carries a controlling device for the valve, such part being designated by 50 and being pivoted to the beam-arm 4 about midway its length and jointed to the relatively long thrust-rod 51, which is operatively connected to the regulator R, the purpose of which latter will be hereinafter specified.

The jointed connection between the rod 51 and the device 50 is in alinement with the axis of movement of the beam B, so that as the latter or the beam-arm 4 descends during the loading period the device 50 constitutes, practically, a fixture upon or rigid extension of the beam. The valve-controlling device, which is also a valve-opening actuator, has at its free end a cam-shaped recess 52 and a stop-shoulder 53. When the valve is in its wide-open position, the antifriction-roll 53' on the valve-closing actuator 47 is in contact with the face of the cam-notch 52, which is of such a shape or curvature as to permit a relatively slow falling movement of the valve-actuator 47 and closing of the valve. As the beam descends the roll 53' will ride along said cam-face until it reaches the relatively deep portion of the cam-recess 52, as indicated in Fig. 3, when the device 50 will be oscillated, by reason of its connection with the regulator R, to firmly lock the valve against return movement during the discharge of a load.

The regulator R is in the form of a funnel-shaped hopper supported between the end walls of the U-shaped base 2 for reciprocatory movement, and it will be alternately depressed by the weight of the charges of material successively received from the respective chambers of the weighing device or bucket G. The regulator R has a rearwardly-extending counterweighted arm 55 pivotally supported upon the base 2, and said arm is also forked, the branches of such fork being connected to the regulator at opposite sides thereof, and the rod 51, to which I have previously alluded, is shown pivoted to the counterweighted arm 55, whereby when the hopper R is depressed an opposite movement will be imparted to said arm 55, the rod 51, and the rear arm of the valve-controlling device 50 for throwing the latter into its valve-locking position, as indicated in Fig. 3.

As the load is discharged from the bucket its weight M by descending will elevate the lightened bucket, the beam-arm 4 ascending therewith; but the member 50 will remain in its shifted position, in which it has been thrown by the depression of the hopper, by reason of its pivotal connection with the beam.

When the load of material has nearly passed from the regulator R, the bucket being then completely empty and having reached the limit of its upstroke, the counterweighted arm 55 of the regulator promptly drops, thereby pulling the rod 51, and consequently the right-hand arm of the valve controlling and actuating device, downward, the regulator during this period being caused to rise by the action of the counterweighted arm, and the face of the cam-notch 52, by traveling along the antifriction-roll 53' of the counterweighted valve-actuating lever 47, will swing the same from the position shown in Fig. 3 to that illustrated in Fig. 2, so that the arms 44 and 45 will be oppositely rocked and through the links 42 and 43 and the cross-head 41, which is connected to the valve-stem, will slide said valve along the interior of the valve casing or cylinder 32 until the port 36 of said valve registers with the supply-opening 33 of said cylinder, when the supply-stream may flow toward the bucket G.

The tripper for the closer and spout latch or lock 22 will be preferably carried upon the framing of the machine, it being shown as a rock-arm 60 rigidly connected to the rock-shaft 61, which is supported between the two longitudinal portions of the standard 3, said latch-tripper or arm having at its free end the projection or roll 62, which is normally disposed in the path of movement of the curved portion 23 of the locking-lever 22, so that as the bucket descends during the making up of a load said lever will be caused to impinge against the projection or roll 62, and on the continuation of such movement the stop-pin 21 will be lowered until it is below the stop-notch 25, this action releasing the spout S and consequently the closer L, so that the latter can be forced open by the weight of the charge within the chamber 13. As the closer is thus opened the beam W will be rocked, and an opposite movement will be given to the rod 14 for returning the piston-valve or closer L to its seat 12', the spout S being also swung from the position shown in Fig. 2 by the action of the opening closer to that illustrated in Fig. 3, so that it can deliver the stream to the empty chamber 12 at the proper period in the operation of the machine or when the regulator R has been fully emptied of its contents.

I have provided means for throwing the latch-tripper 23 into an inoperative position on the discharge of a load, whereby either one of the stops 24 or 25 on the locking-lever 22 can readily engage the stop-pin 21, that is operative with the spout S and the two closers L and L', respectively, to lock said spout in its shifted position and to also lock one of the closers wide open while the other is locked closed, and such means is preferably connected with the regulator R for operation.

The rock-shaft 61 is furnished with a crank-arm 65, to the outer end of which is pivoted the link 66, said link being likewise attached to the reciprocatory thrust-rod or connector 51.

The latch-tripping member 60 is normally disposed in a vertical position, so that the lever 22 may impinge against the same on the downstroke of the bucket to effect the release of either of the two closers, and it will be evident that if the arm 60 be swung to the right said lever 22 may drop for a considerable distance, whereby either one of the stop-notches 24 and 25 may engage the projecting stop-pin 21 on the rock-arm 20 to lock the spout and the two closers L and L', respectively, in their open and shut positions, or vice versa.

The regulator as it is depressed by the body of material deposited therein by the discharging bucket will, through the counterweighted arm 55, thrust the rod 51 upward, thereby swinging the arm 60 outward through the medium of the interposed link 66 and crank-arm 65 for throwing the latch-tripper or arm 60 into its inoperative position or opposite the curved portion 23 of the lever 22 to permit the further dropping of the latch or counterweighted lever 22 to accomplish the hereinbefore-specified purposes.

I dispose below the piston-valves L and L' the guides 70 and 71, respectively, which are annular and the diameters of which equal those of the outlets or valve-seats, whereby wabbling of the piston-valves L and L' as they alternately open and shut is prevented, and at suitable places in the guides I form ports 72 and 73, in the circumference thereof, through which material may flow, as shown in Fig. 3.

The operation of the hereinbefore-described machine, briefly stated, is as follows: In Fig. 2 the closer L' is represented shut and held in such position by the locking lever or latch 22, the notch 25 of which is in engagement with the stop or pin 21, that is connected to the stream-diverter S, while the valve 35 is open to permit the stream of material to pass from the cylinder 32 through the port 36 of the valve and the supply-opening 33, from whence it flows toward the stream-diverter S, to be delivered thereby to the bucket chamber or compartment 13, said bucket-chamber in said figure being shown having a partial load. When a certain proportion of the load has been received by the bucket, it, with the scale-beam B, will descend, so that the valve-controller 50, by having its cam-face 52 fall away from the projection 53' on the valve-closing actuator 47, will permit the latter to drop, whereby it may, by reason of its operative connection with the valve, slide the same in the cylinder 32 to progressively reduce the volume of and subsequently cut off the supply-stream. At a point just before the completion of the bucket-load the locking-lever 22 will abut against the projection 62 on the rock-arm 60, so that as the bucket continues to descend the device 22 will be lifted relatively to the stop-pin 21, whereby the stop-notch 25 may be disengaged from said stop-pin, and when this last-mentioned operation takes place the closer L' will be forced open and, through the walking-beam W, will shut the companion closer L, and in which position said closer L is locked by the lever 22, and these operations will alternate while the machine is in use.

Having described my invention, I claim—

1. The combination, with a weighing device having a plurality of load-receiving chambers each of which has a closer, of a walking-beam connected with said closers and having a rock-arm provided with a stop-pin; a locking-lever on the weighing device, having a series of notches thereon adapted alternately to engage said stop-pin, said locking-lever having a curved overrun face between the locking-notches; and a trip device for said lever.

2. The combination, with a weighing device having a plurality of load-receiving chambers each of which has a closer, of a walking-beam connected with said closers and having a rock-arm provided with a stop-pin; and a locking-lever on the weighing device, having a series of notches thereon adapted alternately to engage said stop-pin and also having a curved overrun face between the locking-notches, said lever being provided with shoulders adjacent to the locking-notches against which the stop-pin is adapted to abut as the rock-arm alternately oscillates.

3. The combination, with a weighing device having a plurality of load-receiving chambers each of which has a closer, of a walking-beam connected with said closers and having a rock-arm provided with a stop-pin; a locking-lever on the weighing device, having a series of notches adapted alternately to engage said stop-pin; a regulator situated to receive a load from the weighing apparatus; and a tripper for said locking-lever, connected with the regulator.

4. The combination, with a weighing device having a plurality of load-receiving chambers each of which has a closer, of a walking-beam carrying a stream-diverting spout adapted alternately to direct a supply of material into said load-receiving chambers, said walking-beam being connected with said closers; a rock-arm fixed to said walking-beam and having a stop-pin; a locking-lever on the weighing device, having a series of notches adapted alternately to engage said stop-pin; and a tripping device for the locking-lever.

5. The combination, with a weighing device having a plurality of load-receiving chambers each of which has a closer, of a walking-beam connected with said closers and having a rock-arm provided with a stop-pin; a locking-lever having a series of notches adapted alternately to engage said stop-pin; a regulator situated to receive a load discharged from the weighing device; stream-supplying means; a valve; a scale-beam; a controlling device for the valve, connected with the regulator; and a tripper for the locking-lever, also connected with said regulator.

6. The combination, with a weighing device having a plurality of load-receiving chambers each of which has an annular opening constituting a valve-seat; of a series of piston-valves, one for each of said discharge-openings; rods fixed to said piston-valves; a walking-beam connected with said rods and having a rock-arm provided with a stop-pin; and a locking-lever on said weighing device, having a series of notches adapted to alternately engage said stop-pin, said locking-lever having a curved overrun face between the locking-notches.

7. The combination, with a weighing device having a plurality of load-receiving chambers each of which has an annular opening constituting a valve-seat; of a series of piston-valves, one for each of said discharge-openings; rods fixed to said piston-valves; a walking-beam having a rock-arm provided with a stop-pin; links attached, respectively, to said connecting-rods and to the opposite end of the walking-beam; and a locking-lever on the weighing device, having a series of notches adapted alternately to engage said stop-pin, said locking-lever having a curved overrun face between the locking-notches.

8. The combination, with a weighing device having a plurality of load-receiving chambers each of which has a closer, of a walking-beam connected with said closers and having a rock-arm provided with a stop-pin; a locking-lever on the weighing device, having a series of notches thereon adapted alternately to engage said stop-pin, said locking-lever having its free end curved; a tripping device for said lever; and means operated by the discharge of a load to throw said tripping device to a point opposite the curved portion of said lever, to thereby render the tripping device ineffective.

9. The combination, with a weighing device having a plurality of load-receiving chambers each of which has a valve-seat, of a series of piston-valves one for each of said load-receiving chambers; a stream-diverter connected with the piston-valves and supported to alternately deliver a stream of material to the respective load-receiving chambers, and having a stop; and a locking device provided with a series of stop-notches coöperative with said first-mentioned stop and adapted to alternately lock said stream-diverter in its extreme shifted positions and to simultaneously lock said piston-valves in their wide-open and shut positions, respectively, said locking device having shoulders adjacent to its stop-notches against which the stop that is operative with the stream-diverter is adapted to abut as the latter is shifted back and forth, and being also provided with a curved overrun face between said stop-notches.

10. The combination, with a weighing device having a series of load-receiving chambers, of closers one for each of said chambers; a stream-diverter coöperative with said closers and supported for shifting movement to alternately direct a stream of material to the respective chambers of the weighing device, and provided with a stop; a locking device having a series of stops coöperative with said first-mentioned stop and adapted to alternately lock the stream-diverter in its extreme shifted positions; a trip device for said locking device; and means for throwing said trip device into an inoperative position.

11. The combination, with a weighing device having a series of load-receiving chambers, of closers one for each of said chambers; a stream-diverter coöperative with said closers and supported for shifting movement to alternately direct a stream of material to the respective chambers of the weighing device, and provided with a stop; a locking device having a series of stops coöperative with the first-mentioned stops and adapted to alternately lock the stream-diverter in its extreme shifted positions; a tripping member for said locking device; a reciprocatory regulator supported for movement beneath the bucket; and connections between said regulator and the tripping device.

12. The combination, with framework of a weighing device having a plurality of load-receiving chambers, of a stream-diverter coöperative with said closers and supported for shifting movement to alternately direct a stream of material to the respective chambers of the weighing device, and provided with a stop; a locking device having a series of stops coöperative with said first-mentioned stop and adapted to alternately lock the stream-diverter in its extreme shifted positions; a shaft carried by the framework and provided with a tripping device and also furnished with a crank-arm; a reciprocatory regulator supported for movement beneath the weighing device; and operative connections between said regulator and said crank-arm.

13. The combination, with a weighing device having a plurality of load-receiving chambers and with a supporting scale-beam therefor, of closers one for each of said chambers; a stream-diverter coöperative with said closers and supported for shifting movement to alternately direct a stream of material to the respective chambers of the weighing device, and provided with a stop; a locking device having a series of stops coöperative with said first-mentioned stop and adapted to alternately lock the stream-diverter in its extreme shifted positions; stream-supply means including a reciprocatory valve; a controlling device for said valve, mounted upon the scale-beam; a regulator suspended beneath the bucket, for reciprocatory movement; and a connector between said regulator and the valve-controller, the joint between said connector and valve-controller being normally in alinement with the axis of movement of said beam, whereby as the latter descends during the loading period the valve-controller constitutes a fixture on the beam.

14. The combination, with a bucket and its supporting scale-beam, of a cylinder having an outlet; a reciprocatory bored valve supported within said cylinder and having a stem furnished with a cross-head; a counterweighted lever mounted on said cylinder and connected to said cross-head; a valve-controller mounted upon the scale-beam and having a cam-notch coöperative with a projection on said counterweighted lever; and a regulator supported for reciprocatory movement beneath the bucket and operatively connected to said valve-controller.

15. The combination, with a weighing device and a plurality of load-receiving chambers, of closers one for each of said chambers; a stream-diverter supported for shifting movement to alternately deliver a stream of material to the respective chambers of the weighing device; a scale-beam; a locking member adapted to alternately lock the stream-diverter in its extreme shifted positions; a tripping member for said locking device; a cylinder having a reciprocatory valve therein provided with a port; an actuating device connected to said valve; a valve-controller mounted upon the scale-beam and having a cam-notch coöperative with a projection on the valve-actuator; and a regulator supported for reciprocatory movement beneath the bucket and operatively connected, respectively, to said valve-controller and the tripping member.

FRANCIS H. RICHARDS.

Witnesses:
FRED. J. DOLE,
F. N. CHASE.